(12) United States Patent
Hirata et al.

(10) Patent No.: US 10,913,027 B2
(45) Date of Patent: Feb. 9, 2021

(54) CO2 SEPARATION DEVICE IN GAS AND ITS MEMBRANE SEPARATION METHOD AND METHOD FOR CONTROLLING MEMBRANE SEPARATION OF CO2 SEPARATION DEVICE IN GAS

(71) Applicant: MITSUBISHI HEAVY INDUSTRIES, LTD., Tokyo (JP)

(72) Inventors: Takuya Hirata, Tokyo (JP); Kouji Horizoe, Tokyo (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 486 days.

(21) Appl. No.: 15/525,365

(22) PCT Filed: Oct. 21, 2015

(86) PCT No.: PCT/JP2015/079723
§ 371 (c)(1),
(2) Date: May 9, 2017

(87) PCT Pub. No.: WO2016/076091
PCT Pub. Date: May 19, 2016

(65) Prior Publication Data
US 2017/0320009 A1    Nov. 9, 2017

(30) Foreign Application Priority Data

Nov. 12, 2014   (JP) .................... 2014-230202

(51) Int. Cl.
*B01D 53/22*    (2006.01)
*B01D 53/14*    (2006.01)
(Continued)

(52) U.S. Cl.
CPC ....... *B01D 53/226* (2013.01); *B01D 53/1443* (2013.01); *B01D 53/1475* (2013.01);
(Continued)

(58) Field of Classification Search
CPC .......... B01D 53/1475; B01D 2256/245; B01D 61/58; B01D 2257/504; B01D 53/1443;
(Continued)

(56) References Cited

U.S. PATENT DOCUMENTS 4,112,051 A * 9/1978 Sartori ............... B01D 53/1475
                                                      423/223
4,491,566 A * 1/1985 Adams ............... B01D 53/1412
                                                      422/106
(Continued)

FOREIGN PATENT DOCUMENTS

JP        60-7921 A       1/1985
JP        H04-277008 A    10/1992
(Continued)

OTHER PUBLICATIONS

International Search Report dated Dec. 8, 2015, issued in counterpart International Application No. PCT/JP2015/079723. (25 pages).
(Continued)

*Primary Examiner* — Anthony R Shumate
(74) *Attorney, Agent, or Firm* — Westerman, Hattori, Daniels & Adrian, LLP

(57) ABSTRACT

A source gas introduction line for introducing source gas containing $CO_2$, a first membrane separator for membrane-separating $CO_2$ from source gas, a first permeable gas discharge line for discharging first permeable gas permeated by membrane separation of the first membrane separator, a first non-permeable gas discharge line for discharging first non-permeable gas not permeated by membrane separation of the first membrane separator, a second membrane separator provided at a downstream side of the first membrane separator and for further membrane-separating $CO_2$ from the first non-permeable gas, a second permeable gas discharge line for discharging second permeable gas permeated by membrane separation of the second membrane separator, a
(Continued)

second permeable gas return line branched from a part of the second permeable gas discharge line and for returning the second permeable gas to a source gas side, and a $CO_2$ concentration meter are included.

15 Claims, 10 Drawing Sheets

(51) Int. Cl.
B01D 61/58 (2006.01)
C01B 32/50 (2017.01)
C10L 3/10 (2006.01)

(52) U.S. Cl.
CPC .............. B01D 61/58 (2013.01); C01B 32/50 (2017.08); C10L 3/104 (2013.01); B01D 2256/245 (2013.01); B01D 2257/504 (2013.01); B01D 2257/70 (2013.01); B01D 2257/80 (2013.01); C01B 2210/0012 (2013.01); C10L 2290/10 (2013.01); C10L 2290/548 (2013.01); Y02C 20/40 (2020.08)

(58) Field of Classification Search
CPC .............. B01D 53/226; B01D 2257/80; B01D 2257/70; Y02C 10/06; Y02C 10/10; C01B 2210/0012; C01B 32/50; C10L 3/104; C10L 2290/548; C10L 2290/10
See application file for complete search history.

(56) References Cited

U.S. PATENT DOCUMENTS

| | | | |
|---|---|---|---|
| 4,514,379 A * | 4/1985 | Miller | B01D 53/1425 423/228 |
| 5,102,432 A | 4/1992 | Prasad | |
| 5,378,263 A | 1/1995 | Prasad | |
| 6,197,090 B1 * | 3/2001 | Yamashita | B01D 53/22 95/12 |
| 9,205,382 B2 * | 12/2015 | Sawamura | B01D 53/22 |
| 2004/0099138 A1 | 5/2004 | Karode et al. | |
| 2007/0125537 A1 | 6/2007 | Lokhandwala et al. | |
| 2013/0108531 A1 | 5/2013 | Mitariten | |
| 2013/0266380 A1 * | 10/2013 | Capron | F16L 1/24 405/184.4 |
| 2013/0333559 A1 * | 12/2013 | Nakagawa | B01D 53/1412 95/24 |
| 2014/0301927 A1 * | 10/2014 | Udatsu | B01D 53/62 423/220 |
| 2015/0033701 A1 * | 2/2015 | Hyde | F01N 3/0857 60/274 |
| 2016/0101385 A1 * | 4/2016 | Mao | B01D 53/1493 423/228 |

FOREIGN PATENT DOCUMENTS

| | | |
|---|---|---|
| JP | 06-099035 A | 4/1994 |
| JP | H07-748 A | 1/1995 |
| JP | 10-59705 A | 3/1998 |
| JP | 2000-33222 A | 2/2000 |
| JP | 2002-363114 A | 12/2002 |
| JP | 2006-507385 A | 3/2006 |
| JP | 2009-679 A | 1/2009 |
| JP | 2009-29674 A | 2/2009 |
| JP | 2012-236134 A | 12/2012 |

OTHER PUBLICATIONS

Office Action dated Jan. 9, 2018, issued in counterpart Japanese Application No. 2014-230202, with English machine translation. (13 pages).

* cited by examiner

CO2 SEPARATION DEVICE IN GAS AND ITS MEMBRANE SEPARATION METHOD AND METHOD FOR CONTROLLING MEMBRANE SEPARATION OF CO2 SEPARATION DEVICE IN GAS

FIELD

The present invention relates to a $CO_2$ separation device in gas and its membrane separation method, and to a method for controlling membrane separation of $CO_2$ separation device in gas.

BACKGROUND

For example, as techniques for separating and collecting carbon dioxide ($CO_2$) from natural gas containing methane ($CH_4$), a chemical absorption method and a physical absorption method are proposed (see Patent Literature 1).

(1) In an absorption method of a chemical absorption method, absorbent in which carbon dioxide has been absorbed in a saturation state is heated and regenerated and high-concentration carbon dioxide is collected after carbon dioxide in flue gas has been absorbed and removed by amine or alkaline absorbent.

(2) In an absorption separation method of a physical absorption method, carbon dioxide adsorbed by making decompression state and/or overheated state is desorbed and adsorbent is regenerated, and high-concentration carbon dioxide is collected after carbon dioxide in flue gas is adsorbed and removed by zeolite, molecular sieve, or carbon adsorbent.

In addition, a technique for separating carbon dioxide from natural gas containing methane as main component by using $CO_2$ separation membrane with zeolite and the like is proposed. In particular, in a facility of natural gas transportation, carbon dioxide from natural gas is required to be predetermined concentration or less since corrosion is prevented by lowering concentration of carbon dioxide to be 2% or less, for example (see Patent Literature 2).

CITATION LIST

Patent Literature

Patent Literature 1: Japanese Laid-open Patent Publication No. 6-99035
Patent Literature 2: Japanese Laid-open Patent Publication No. 2012-236134

SUMMARY

Technical Problem

In a membrane separation method by using $CO_2$ separation membrane to obtain non-permeable gas in the separation membrane from which $CO_2$ has been removed from mixed natural gas having $CO_2$ concentration of 3 to 75% by selectively condensing $CO_2$ to permeable gas side of the separation membrane, there is a problem that separation efficiency is decreased and $CO_2$ is left to the non-permeable gas side in the case where $CO_2$ concentration of non-permeable gas is lowered, and it is difficult to lower $CO_2$ concentration of the non-permeable gas side to be 2% or less since the pressure difference between non-permeable gas and permeable gas through membrane is a driving force of gas permeation.

In the case where non-permeable gas of $CO_2$ separation membrane is valuable gas such as methane and hydrogen in particular, in consideration of using this valuable gas, it is desirable to highly purify non-permeable side gas and it is necessary to reduce the residual amount of $CO_2$ of the non-permeable gas side.

In addition, there is a problem that, as $CO_2$ concentration in mixed natural gas becomes lower, concentration of mixture of substance other than $CO_2$ in permeable gas of $CO_2$ separation membrane increases. As a result, in the case where $CO_2$ removal gas is valuable (for example, methane), there is a problem that mixture of valuable gas for the $CO_2$ separation membrane leads to reduction of collection rate of valuable gas from mixed gas.

In particular, as for natural gas, since $CO_2$ concentration in gas associated from oilfield varies between 3 and 75% in mixture ratio for example, it is required to obtain high-purity $CO_2$ gas even if $CO_2$ concentration in source gas is low.

Moreover, when $CO_2$ that is permeable gas of $CO_2$ separation membrane is used as valuable substance for the purpose of $CO_2$ EOR (Enhanced Oil Recovery) for example, it is required for permeable gas purity to be high.

Therefore, technique for improving both the purity of $CO_2$ that is non-permeable gas and the purity of methane that is permeable gas is desired for separating $CO_2$ from source gas such as natural gas for example by $CO_2$ separation membrane.

In consideration of the above problems, the purpose of the present invention is to provide a $CO_2$ separation device in gas and its membrane separation method, and a method for controlling membrane separation of a $CO_2$ separation device in gas that improve both the purity of $CO_2$ that is non-permeable gas and the purity of methane that is permeable gas.

Solution to Problem

The first aspect of the invention in order to solve the above-describe problem is a $CO_2$ separation device in gas, including a source gas introduction line configured to introduce source gas containing $CO_2$, a first membrane separator connected to an end of the source gas introduction line and configured to membrane-separate $CO_2$ from the source gas, a first permeable gas discharge line configured to discharge first permeable gas permeated by membrane separation of the first membrane separator, a first non-permeable gas discharge line configured to discharge first non-permeable gas not permeated by membrane separation of the first membrane separator, a second membrane separator provided at a downstream side of the first membrane separator and configured to membrane-separate $CO_2$ from first non-permeable gas, a second permeable gas discharge line configured to discharge second permeable gas permeated by membrane separation of the second membrane separator; and a return line of second permeable gas branched from a part of the second permeable gas discharge line and configured to return the second permeable gas to a source gas side or a first non-permeable gas side.

The second aspect is the $CO_2$ separation device in gas according to the first aspect, in which $CO_2$ concentration in the first permeable gas is obtained, and in the case where the $CO_2$ concentration is the predetermined value or less, the second permeable gas is recycled to the source gas side.

The third aspect is the $CO_2$ separation device in gas according to the first aspect, in which $CO_2$ concentration in the source gas is obtained, and in the case where the $CO_2$ concentration is the predetermined value or less, the second permeable gas is recycled to the source gas side.

The fourth aspect is the $CO_2$ separation device in gas according to any one of the first to third aspects, further including a first permeable gas branch line branched from a part of the first permeable gas discharge line and configured to return the first permeable gas to the source gas.

The fifth aspect is the $CO_2$ separation device in gas according to any one of the first to fourth aspects, further including a $CO_2$ concentration meter configured to measure $CO_2$ concentration in the source gas or the first permeable gas or the second permeable gas.

The sixth aspects is the $CO_2$ separation device in gas according to any one of the first to fourth aspects, further including a $CO_2$ concentration meter for measuring $CO_2$ concentration in the source gas, and a third membrane separator for pre-processing provided at an upstream side of the first membrane separator and configured to separate $CO_2$ in the source gas in accordance with $CO_2$ concentration in the source gas to obtain source gas having $CO_2$ gas concentration of the predetermined concentration.

The seventh aspect is the $CO_2$ separation device in gas according to any one of the first to sixth aspects, in which a compressor provided in the source gas introduction line and configured to compress the introduced source gas is provided at an upstream side of the first membrane separator.

The eighth aspect is the $CO_2$ separation device in gas according to any one of the first to seventh aspects, further including $CO_2$ separation equipment for further separating $CO_2$ in the second non-permeable gas discharged from the part of the second non-permeable gas discharge line, and a return line of $CO_2$ gas configured to return the $CO_2$ gas separated by the $CO_2$ separation equipment to the source gas or the first non-permeable gas.

The ninth aspect is a method of membrane separation in a $CO_2$ separation device in gas including serially providing membrane separators including separation membrane for selectively separating $CO_2$ from source gas containing $CO_2$ in two stages, obtaining $CO_2$ concentration in the source gas or first permeable gas after membrane separation by the first membrane separator when first non-permeable gas not permeated by membrane separation of the first membrane separator in the first stage is membrane-separated by the second membrane separator in the second stage; and recycling second permeable gas after membrane separation by the second membrane separator to a source gas side in the case where the obtained $CO_2$ concentration is a predetermined value or less.

The tenth aspect is the method of membrane separation in the $CO_2$ separation device in gas according to the ninth aspect, further including returning the first permeable gas after membrane separation by the first membrane separator to the source gas.

The eleventh aspect is the method of membrane separation in the $CO_2$ separation device in gas according to the ninth or tenth aspect, further including further separating $CO_2$ in second non-permeable gas from the second membrane separator by $CO_2$ separation equipment, and returning the $CO_2$ gas separated by the $CO_2$ separation equipment to the source gas or the first non-permeable gas.

The twelfth aspect is a method for controlling membrane separation in the $CO_2$ separation device in gas, including: serially providing first and second membrane separators including separation membrane for selectively separating $CO_2$ from source gas containing $CO_2$ in two stages; obtaining $CO_2$ concentration in the source gas when first non-permeable gas not permeated by membrane separation of the first membrane separator in the first stage is membrane-separated by the second membrane separator in the second stage; and membrane-separating $CO_2$ in the source gas by a third membrane separator for pre-processing and introducing third non-permeable gas not membrane-separated by the third membrane separator in the first membrane separator to selectively separate $CO_2$ in the case where the obtained $CO_2$ concentration in the source gas is a predetermined value or more.

Advantageous Effects of Invention

According to the present invention, the second permeable gas in which $CO_2$ is condensed is introduced in source gas and the $CO_2$ partial pressure is increased by returning the second permeable gas to the source gas side. As a result, since the $CO_2$ concentration in the $CO_2$ additive source gas is increased more than the case in which the second permeable gas is not recycled, the driving force of membrane separation by the first membrane separator is improved.

BRIEF DESCRIPTION OF DRAWINGS

FIG. 3-1 is a schematic diagram illustrating another $CO_2$ separation device in gas according to the first example.

FIG. 3-2 is a schematic diagram illustrating another $CO_2$ separation device in gas according to the first example.

DESCRIPTION OF EMBODIMENTS

Hereinafter, preferred examples of the present invention will be described in detail with reference to the accompanying drawings. Note that, the present invention is not limited by this example and configurations obtained by combining each example may also be included if there are several examples.

First Example

Figure 1:
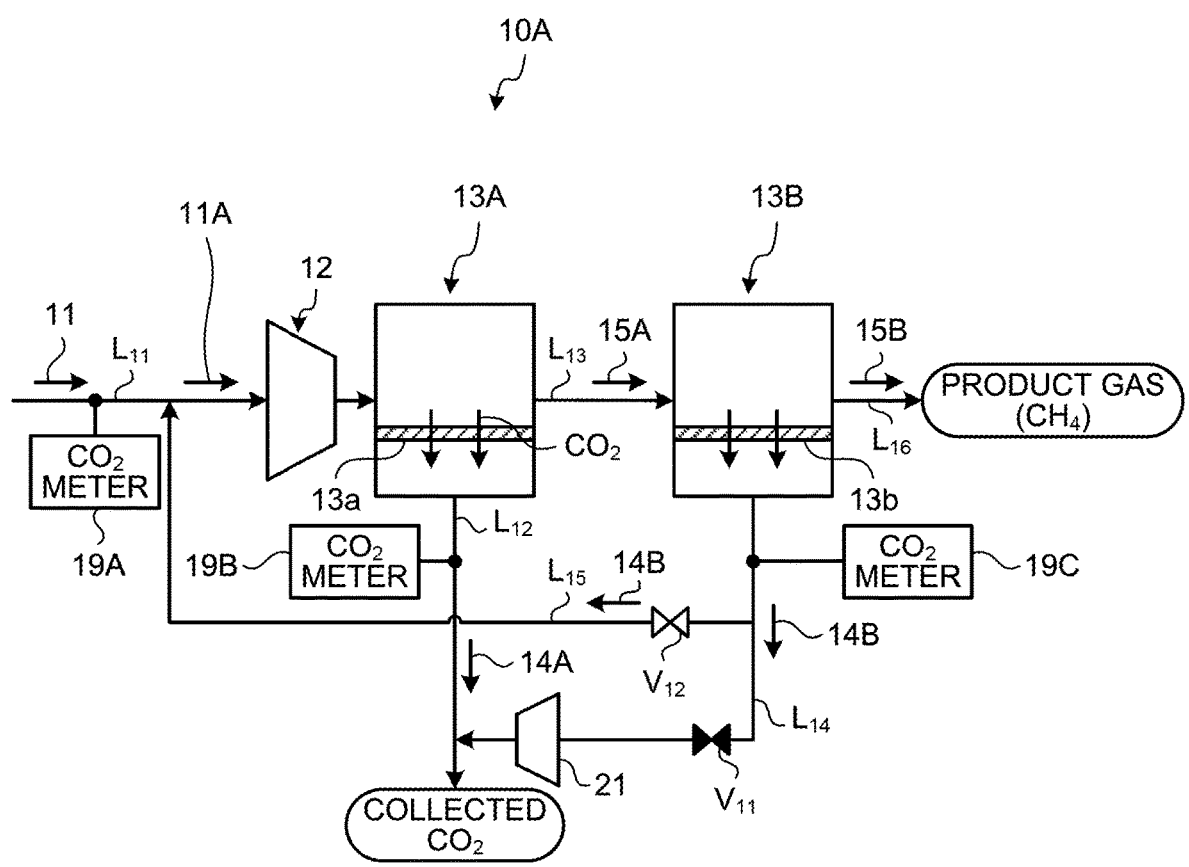
FIG. 1 is a schematic diagram illustrating a $CO_2$ separation device in gas according to a first example.

FIG. 1 is a schematic diagram illustrating a $CO_2$ separation device in gas according to a first example.

As illustrated in FIG. 1, a $CO_2$ separation device 10A in gas according to the present example includes: a source gas introduction line $L_{11}$ for introducing source gas 11 containing $CO_2$; a compressor 12 provided in the source gas introduction line $L_{11}$ and for compressing the introduced source gas 11; a first membrane separator 13A connected to the end of the source gas introduction line $L_{11}$ and for membrane-separating $CO_2$ from the source gas 11 by a separation membrane 13a; a first permeable gas discharge line $L_{12}$ for discharging first permeable gas 14A permeated by membrane separation by the first membrane separator 13A; a first non-permeable gas discharge line $L_{13}$ for discharging first non-permeable gas 15A not permeated by membrane separation of the first membrane separator 13A; a second membrane separator 13B provided at the downstream side of the first membrane separator 13A and for further membrane-separating $CO_2$ from the first non-permeable gas 15A by a separation membrane 13b; a second permeable gas discharge line $L_{14}$ for discharging second permeable gas 14B permeated by membrane separation by the second membrane separator 13B; and a return line $L_{15}$ of the second permeable gas branched from a part of the second permeable gas discharge line $L_{14}$ and for returning the second permeable gas 14B to the source gas 11.

In the present example, although the source gas 11 is described as source gas containing at least carbon dioxide ($CO_2$) and methane ($CH_4$), the present invention is not limited thereto.

For example, the source gas 11 is natural gas accompanied with oil from the oilfield, natural gas extracted from the gas field, or the like, for example.

The compressor 12 compresses the source gas 11 as natural gas to the predetermined pressure and functions as a driving force of membrane permeation to facilitate membrane separation of $CO_2$. Note that, since the compressor 12 is not necessary if the self-pressure of the source gas 11 reaches the predetermined pressure, the compressor 12 may be bypassed by a bypass line (not illustrated).

Note that, other than a compressor, for example, it may be decompressed by a decompression means at the membrane permeation side by a vacuum pump.

The first membrane separator 13A is a separation device including the separation membrane 13a for selectively permeating $CO_2$, and zeolite film containing zeolite and the like for separating carbon dioxide, molecular gate hollow fiber membrane, molecular gate membrane, and the like can be used as the separation membrane 13a for example, but it is not limited thereto as long as it is a separation membrane that selectively permeates $CO_2$.

The first permeable gas discharge line $L_{12}$ for discharging the first permeable gas 14A that has permeated the separation membrane 13a is connected to the first membrane separator 13A, and the selectively-separated $CO_2$ is collected as collected $CO_2$.

In addition, the first non-permeable gas 15A not permeating this separation membrane 13a is discharged from the first membrane separator 13A through the first non-permeable gas discharge line $L_{13}$.

The second membrane separator 13B has a configuration similar to the first membrane separator 13A, and is a separation device including the separation membrane 13b that selectively permeates $CO_2$, and the separation membrane 13b may be the same kind as the separation membrane 13a, but a different type of separation membrane may be used as necessary.

The end of the first non-permeable gas discharge line $L_{13}$ from the first membrane separator 13A is connected to the second membrane separator 13B, and the second membrane separator 13B introduces the discharged first non-permeable gas 15A to the inside and selectively separates $CO_2$ by the separation membrane 13b.

The second permeable gas discharge line $L_{14}$ that discharges the second permeable gas 14B that has permeated the separation membrane 13b is connected to the second membrane separator 13B, and the selectively-separated $CO_2$ is collected as collected $CO_2$.

Note that, when collecting $CO_2$, there will be pressure difference between the first permeable gas 14A and the second permeable gas 14B by the amount in which $CO_2$ gas is separated. Therefore, the second permeable gas 14B is compressed to the predetermined pressure to be collected $CO_2$ by using an auxiliary compressor 21 so that its pressure becomes equal to that of the first permeable gas 14A.

In addition, second non-permeable gas 15B that does not permeate the separation membrane 13b is discharged from the second membrane separator 13B through a second non-permeable gas discharge line $L_{16}$. The discharged second non-permeable gas 15B will be product gas of methane in the case where the source gas 11 is rich in methane, for example.

In addition, in the present example, a return line $L_{15}$ of the second permeable gas is branched from a part of the second permeable gas discharge line $L_{14}$, its tip is connected to the source gas introduction line $L_{11}$ at the upstream side of the compressor 12, the second permeable gas 14B is returned to the source gas 11, and $CO_2$ is added to the source gas 11 to be $CO_2$ additive source gas 11A.

In addition, a first valve $V_{11}$ is provided in the second permeable gas discharge line $L_{14}$. Moreover, a second valve $V_{12}$ is provided in the return line $L_{15}$ of the second permeable gas. Then, the amount of recycle of the second permeable gas 14B to the source gas 11 side is adjusted by adjusting both valves $V_{11}$ and $V_{12}$.

That is, as illustrated in FIG. 1, when the first valve $V_{11}$ is completely closed and the second valve $V_{12}$ is completely opened, the all amount (100%) of the second permeable gas 14B is returned to the source gas 11 side. Note that, flow rate switching means such as switching valve may be used instead of a regulating valve.

Then, by returning the second permeable gas 14B to the source gas 11 side, the second permeable gas 14B in which $CO_2$ is condensed is introduced in the source gas 11, and the $CO_2$ partial pressure is increased. As a result, since the $CO_2$ concentration in the source gas 11 is increased more than the case in which the second permeable gas 14B is not recycled, a driving force of membrane separation by the first membrane separator 13A is improved. Accordingly, it is possible to improve selective separability of $CO_2$ by the first membrane separator 13A more than the case in which the second permeable gas 14B is not recycled.

Next, operation of the $CO_2$ separation device 10A in gas according to the present example will be described with reference to FIG. 1.

The source gas 11 containing $CO_2$ and $CH_4$ is introduced to the compressor 12, and compressed to the predetermined pressure here. $CO_2$ is selectively separated from the decompressed source gas 11 by the separation membrane 13a of the first membrane separator 13A, and becomes the first permeable gas 14A and collected $CO_2$.

The first non-permeable gas 15A that is not membrane-separated by the separation membrane 13a of the first membrane separator 13A is transported to the second membrane separator 13B at the downstream side of the first membrane separator 13A through the first non-permeable gas discharge line $L_{13}$, and residual $CO_2$ is further selectively separated by the separation membrane 13b of the second membrane separator 13B. The second non-permeable gas 15B that is not permeated by the separation membrane 13b by the second membrane separator 13B is collected as product gas (methane).

In the present example, the second permeable gas 14B is recycled to the source gas 11 by the return line $L_{15}$ of the second permeable gas before being introduced to the compressor 12. By recycling the second permeable gas 14B to the source gas 11 side, the $CO_2$ additive source gas 11A in which $CO_2$ is added is obtained. At this recycle, by completely closing the first valve $V_{11}$ and completely opening the second valve $V_{12}$, the all amount (100%) of the second permeable gas 14B is returned to the source gas 11 side.

By returning the all amount of the second permeable gas 14B to the source gas 11 side, the second permeable gas 14B in which $CO_2$ is condensed is introduced in the source gas 11, and the $CO_2$ partial pressure is increased. As a result, since the $CO_2$ concentration in the $CO_2$ additive source gas 11A is increased more than the case in which the second permeable gas 14B is not recycled, the driving force of membrane separation by the first membrane separator 13A is improved. Accordingly, as compared with the case in which the second permeable gas 14B is not recycled, selective separability of $CO_2$ by the first membrane separator 13A can be improved.

Here, a $CO_2$ meter 19A that measures the $CO_2$ concentration in the source gas 11 is provided in the source gas introduction line $L_{11}$ that supplies the source gas 11. In addition, $CO_2$ meters 19B and 19C are provided in the first permeable gas discharge line $L_{12}$ of the first membrane separator 13A and the second permeable gas discharge line $L_{14}$ of the second membrane separator 13B, respectively.

Then, the $CO_2$ concentration in the source gas 11 or the first permeable gas 14A after membrane separation by the first membrane separator 13A is obtained, and the second permeable gas 14B after membrane separation by the second membrane separator 13B is recycled to the source gas 11 side in the case where the obtained $CO_2$ concentration is the predetermined value or less (in the case of the source gas 11, 20 mol % or less for example, and in the case of the first permeable gas 14A, 90 mol % or less, for example).

Here, Table 1 below shows difference in separation efficiency of $CO_2$ membrane separation between the case in which the second permeable gas 14B is recycled to the source gas 11 to be the $CO_2$ additive source gas 11A at the upstream side of the compressor 12 as in the present example and the case in which it is not recycled as usual.

Note that, the first comparative example shows the case in which only one stage of the first membrane separator 13A is used for processing.

TABLE 1

| | | Source Gas 11 | First Membrane Separator 13A Inlet | First Membrane Separator 13A Permeation Side | First Membrane Separator 13A Non-Permeation Side | Second Membrane Separator 13B Permeation Side | Second Membrane Separator 13B Non-Permeation Side |
|---|---|---|---|---|---|---|---|
| First Experimental Example | $CO_2$ Concentration [mol %] | 20 | 28.6 | 92.3 | 15.7 | 84.8 | 2.5 |
| | $CH_4$ Concentration [mol %] | 80 | 71.4 | 7.7 | 84.3 | 15.2 | 97.5 |
| | $CO_2$ Flow Rate [kmol/h] | 20 | 33 | 18 | 15 | 13 | 2 |
| | $CH_4$ Flow Rate [kmol/h] | 80 | 82 | 1.5 | 80.8 | 2.3 | 78.5 |
| First Comparative Example | $CO_2$ Concentration [mol %] | 20 | 20 | 88.2 | 2.5 | — | — |
| | $CH_4$ Concentration [mol %] | 80 | 80 | 11.8 | 97.5 | — | — |
| | $CO_2$ Flow Rate [kmol/h] | 20 | 20 | 18 | 2 | — | — |
| | $CH_4$ Flow Rate [kmol/h] | 80 | 80 | 2.4 | 77.6 | — | — |

In this experimental example, membrane separation is performed using the source gas 11 having the $CO_2$ concentration of 20 mol % and the $CH_4$ concentration of 80 mol %.

In the case of the first experimental example, as illustrated in FIG. 1, since the second permeable gas 14B is returned to the source gas 11 at the upstream side of the compressor 12, the $CO_2$ concentration at the first membrane separator 13A inlet is increased by 8.6 mol %, which is equivalent to the amount of return, and the $CO_2$ concentration becomes 28.6 mol %. As a result, the $CO_2$ concentration of the first permeable gas 14A at the first membrane separator 13A permeation side becomes 92.3 mol %.

In contrast, in the case of the first comparative example, since the second permeable gas 14B is not returned to the source gas 11 at the upstream side of the compressor 12, the $CO_2$ concentration at the first membrane separator 13A inlet is 20 mol % as the same composition as the source gas 11 and the $CO_2$ concentration of the first permeable gas 14A at the first membrane separator 13A permeation side becomes 88.2 mol %.

Therefore, as in the first experimental example, since it is possible to increase the $CO_2$ concentration of the $CO_2$ additive source gas 11A to be introduced in the first membrane separator 13A more than the $CO_2$ concentration in the source gas 11, it is possible to obtain $CO_2$ gas with high purity in which less non-$CO_2$ gas component is contained as the first permeable gas 14A through the first membrane separator 13A.

As a result, since the amount of non-$CO_2$ gas component (for example, methane) contained in the permeable gas through the first membrane separator 13A to be separated as condensed $CO_2$ is less, it is possible to increase a rate of collection of methane, for example, which is non-$CO_2$ gas component in the first non-permeable gas 15A and the second non-permeable gas 15B, from the source gas.

In addition, where to recycle the second permeable gas 14B is not limited to the upstream side of the compressor 12, and may be anywhere as long as it is the upstream side of the first membrane separator 13A.

Figure 2:
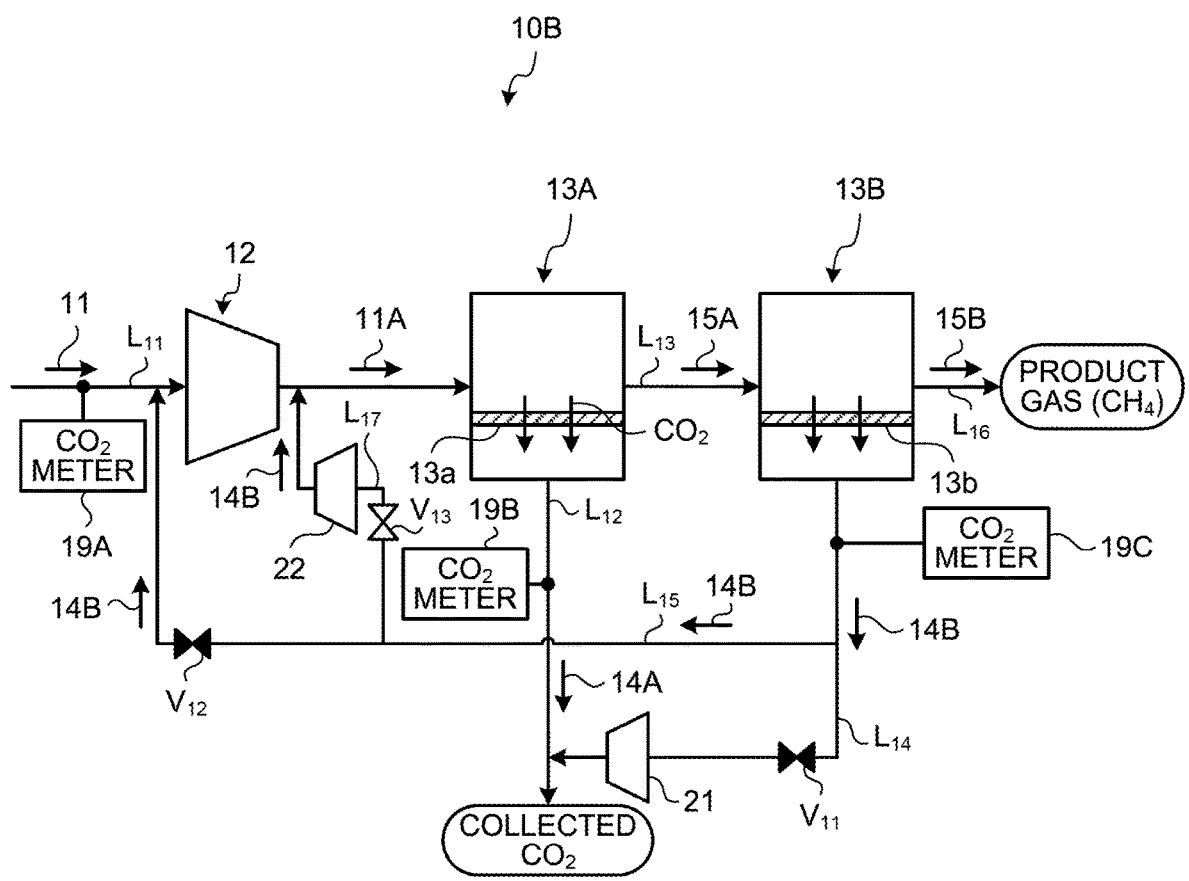
FIG. 2 is a schematic diagram illustrating another $CO_2$ separation device in gas according to the first example.

FIG. 2 is a schematic diagram illustrating another $CO_2$ separation device in gas according to the first example.

As illustrated in FIG. 2, a $CO_2$ separation device 10B in gas according to the present example additionally includes a second permeable gas branch line $L_{17}$ branched from the return line $L_{15}$ of the second permeable gas as compared with the $CO_2$ separation device 10A in gas illustrated in FIG. 1.

The second permeable gas branch line $L_{17}$ is connected to the source gas introduction line $L_{11}$ between the compressor 12 and the first membrane separator 13A. Then, after it is compressed to the predetermined pressure by an auxiliary compressor 22, it is mixed with the compressed source gas 11 to be recycled to the source gas 11 side. In addition, a third valve $V_{13}$ is provided in the second permeable gas branch line $L_{17}$. The amount of recycle of the second permeable gas 14B to be supplied to the source gas 11 after passing the compressor 12 is adjusted by adjusting the third valve $V_{13}$.

Then, the second permeable gas 14B in which $CO_2$ is condensed is introduced in the source gas 11 and the $CO_2$ partial pressure is increased by returning the second permeable gas 14B to the source gas 11 side. As a result, since the $CO_2$ concentration in the source gas 11 is increased more than the case in which the second permeable gas 14B is not recycled, the driving force of membrane separation by the first membrane separator 13A is improved.

Accordingly, as compared with the case in which the second permeable gas 14B is not recycled, selective separability of $CO_2$ by the first membrane separator 13A can be improved.

Figures 1, 3:
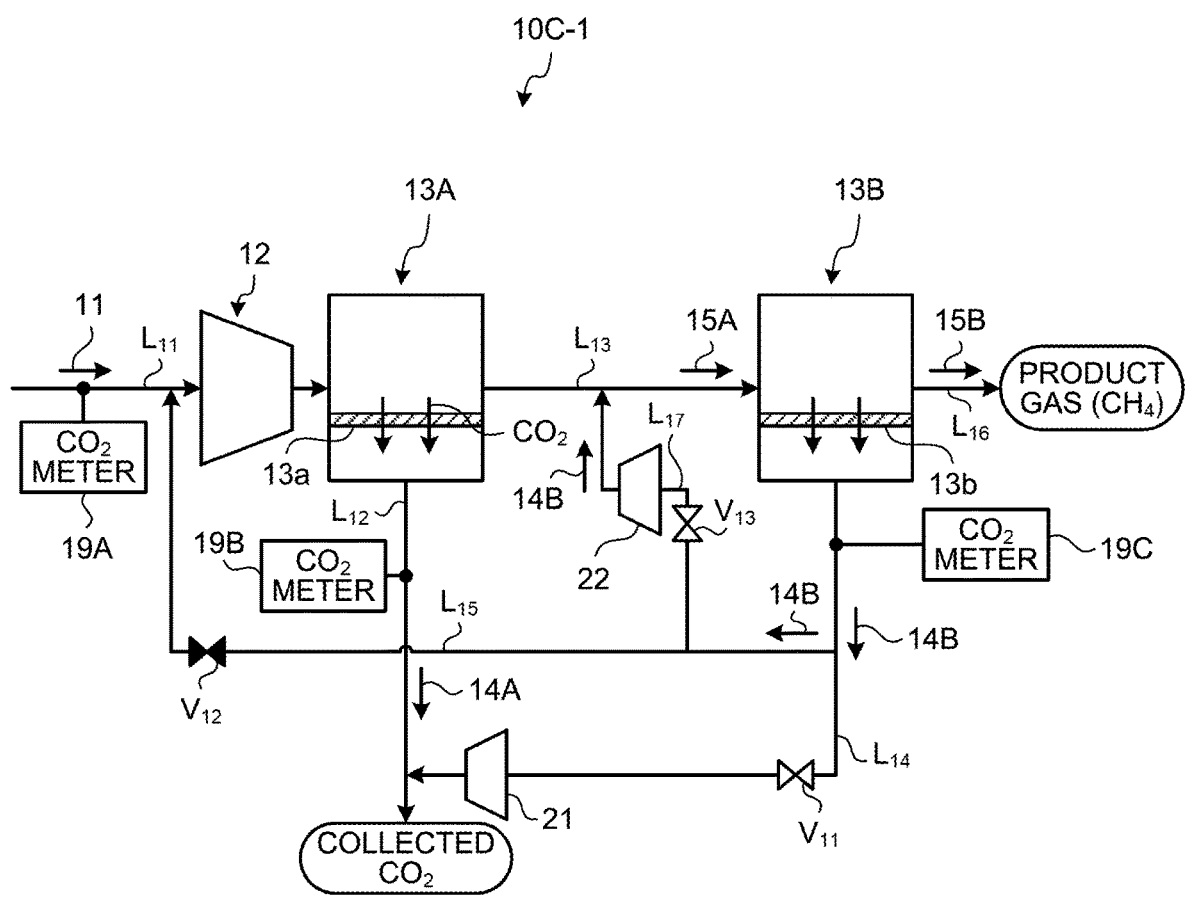
Figures 2, 3:
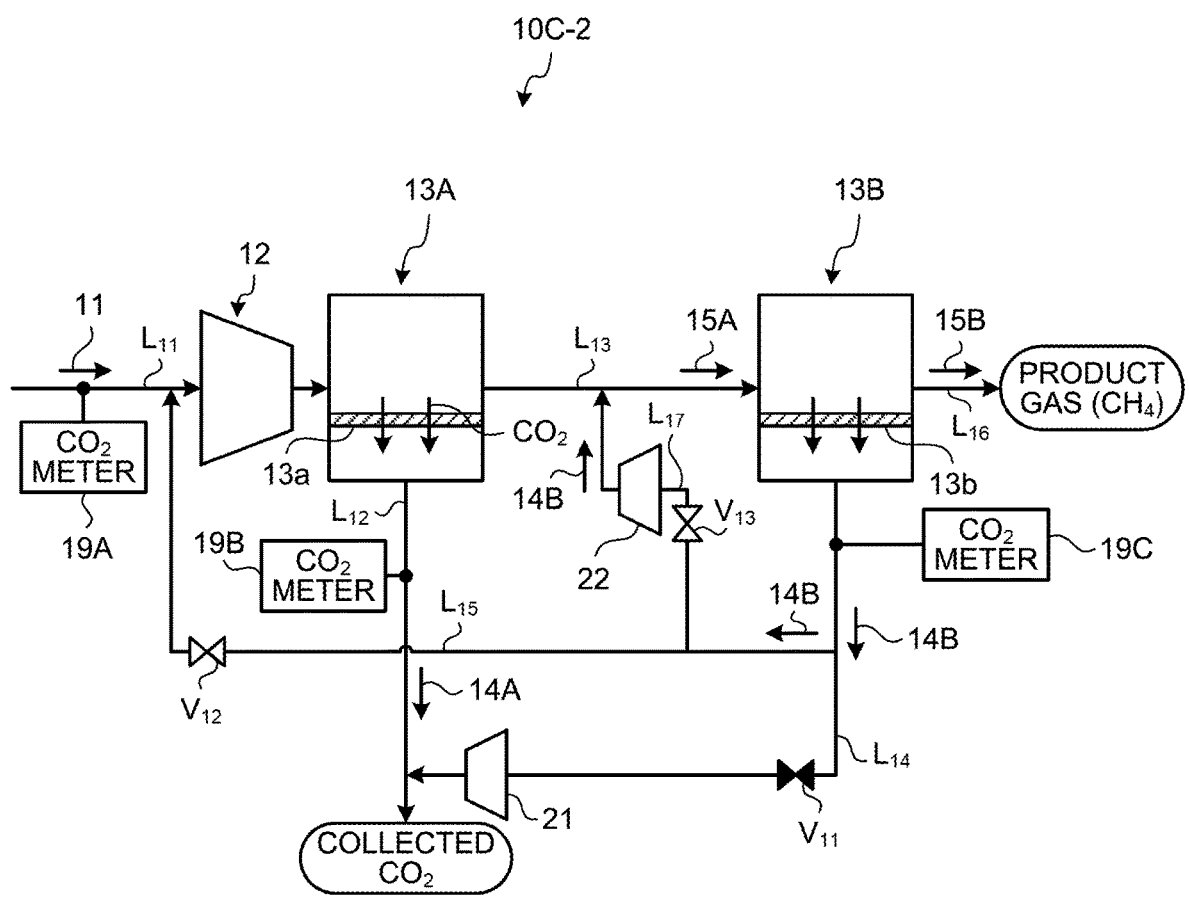

FIGS. 3-1 and 3-2 are schematic diagrams illustrating another $CO_2$ separation device in gas according to the first example.

In the $CO_2$ separation device 10B in gas illustrated in FIG. 2, the second permeable gas branch line $L_{17}$ is connected to the source gas introduction line $L_{11}$ between the compressor 12 and the first membrane separator 13A, and the $CO_2$ concentration in the source gas 11 before being introduced to the first membrane separator 13A is increased.

In contrast, in a $CO_2$ separation device 10C-1 in gas illustrated in FIG. 3-1, the second permeable gas branch line $L_{17}$ is connected to the first non-permeable gas discharge line $L_{13}$ between the first membrane separator 13A and the second membrane separator 13B, and the $CO_2$ concentration in the first non-permeable gas 15A before being introduced to the second membrane separator 13B is increased.

As a result, since the $CO_2$ concentration in the first non-permeable gas 15A is increased more than the case in which the second permeable gas 14B is not recycled, the driving force of membrane separation by the second membrane separator 13B is improved. Accordingly, as compared with the case in which the second permeable gas 14B is not recycled, selective separability of $CO_2$ by the second membrane separator 13B can be improved. Therefore, the $CO_2$ concentration in the second permeable gas 14B can be improved more as compared with the $CO_2$ separation devices 10A and 10B in gas illustrated in FIGS. 1 and 2.

At that time, in the $CO_2$ separation device 10C-1 in gas illustrated in FIG. 3-1, the first valve $V_{11}$ provided in the second permeable gas discharge line $L_{14}$ is completely opened, the second valve $V_{12}$ provided in the second permeable gas return line $L_{15}$ is closed, and part of the second permeable gas 14B is collected as collected $CO_2$. This is to prevent the case in which the $CO_2$ supplied to the second membrane separator 13B is only supplied to product gas when both the first valve $V_{11}$ and the second valve $V_{12}$ are closed.

In addition, in the case where the first valve $V_{11}$ is completely opened and part of the second permeable gas 14B is mixed with the first permeable gas 14A as the collected $CO_2$ through the second permeable gas discharge line $L_{14}$, it is possible to prevent reduction of the $CO_2$ concentration in the collected $CO_2$ that the first permeable gas 14A and the second permeable gas 14B are mixed since the second permeable gas 14B with higher $CO_2$ concentration as compared with the case in which the second permeable gas 14B is not recycled is mixed.

In addition, in a $CO_2$ separation device 10C-2 in gas illustrated in FIG. 3-2, the first valve $V_{11}$ provided in the second permeable gas discharge line $L_{14}$ is closed, the second valve $V_{12}$ provided in the return line $L_{15}$ of the second permeable gas is completely opened, and part of the second permeable gas 14B is returned to the source gas 11 side.

As in the $CO_2$ separation device 10C-2 in gas illustrated in FIG. 3-2, the $CO_2$ concentration in the source gas 11 becomes higher than the case in which the second permeable gas 14B is not recycled and it is also possible to further increase the $CO_2$ concentration in the first permeable gas 14A by completely opening the second valve $V_{12}$ and recycling part of the second permeable gas 14B to the source gas 11.

Second Example

Figure 4:
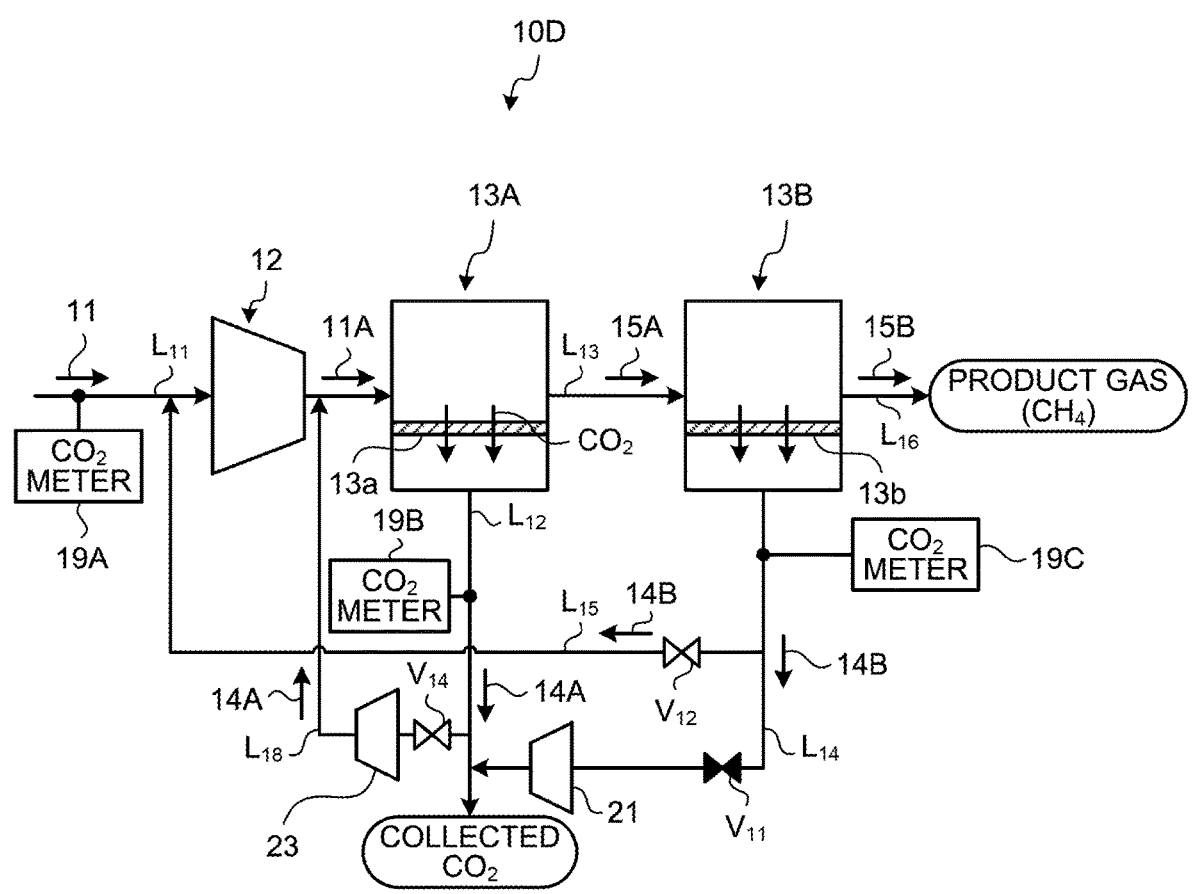
FIG. 4 is a schematic diagram illustrating a $CO_2$ separation device in gas according to a second example.

FIG. 4 is a schematic diagram illustrating a $CO_2$ separation device in gas according to the second example. Note that, the components that are the same as the components of the $CO_2$ separation device in gas according to the first example are given the same reference numerals and description thereof is omitted.

In a $CO_2$ separation device 10D in gas according to the second example, it is a measure for which the $CO_2$ separation efficiency is lowered if only the second permeable gas 14B is recycled in the source gas 11 in the case where the $CO_2$ concentration in the source gas 11 is lower than the predetermined (assumed) value.

As to the configuration of the $CO_2$ separation device 10D in gas according to the present example, a first permeable gas branch line $L_{18}$ branched from the first permeable gas discharge line $L_{12}$ of the first permeable gas 14A is further provided in the $CO_2$ separation device 10A in gas according to the first example.

The first permeable gas branch line $L_{18}$ is connected to the source gas introduction line $L_{11}$ between the compressor 12 and the first membrane separator 13A. Then, after being compressed with an auxiliary compressor 23 to the predetermined pressure, it is mixed with the decompressed source gas 11 so that $CO_2$ is recycled to the source gas 11 side. In addition, a fourth valve $V_{14}$ is provided in the first permeable gas branch line $L_{18}$. Then, the amount of recycle of the first permeable gas 14A to be supplied to the source gas 11 side after passing the compressor 12 is adjusted by the fourth valve $V_{14}$.

As the source gas 11, in the case where the $CO_2$ concentration in natural gas is 10 mol % or less for example, the first permeable gas 14A in which $CO_2$ is condensed is introduced in the source gas 11 in addition to the second permeable gas 14B in which $CO_2$ is condensed and the $CO_2$ partial pressure is increased by introducing the all amount of the second permeable gas 14B and the predetermined amount of the first permeable gas 14A as in the present example. As a result, since the $CO_2$ concentration in the $CO_2$ additive source gas 11A is increased more than the case in which the second permeable gas 14B and the first permeable gas 14A are not recycled, the driving force of membrane separation by the first membrane separator 13A is increased. Accordingly, it is possible to improve selective separability of $CO_2$ by the first membrane separator 13A as compared with the case in which the first permeable gas 14A and the second permeable gas 14B are not recycled.

Here, the $CO_2$ meter 19A that measures the $CO_2$ concentration in the source gas 11 is provided in the source gas introduction line $L_{11}$ that supplies the source gas 11. In addition, the $CO_2$ meters 19B and 19C are also provided in the first permeable gas discharge line $L_{12}$ of the first membrane separator 13A and the second permeable gas discharge line $L_{14}$ of the second membrane separator 13B, respectively.

Then, the $CO_2$ concentration in the source gas 11 or the first permeable gas 14A after membrane separation by the first membrane separator 13A is obtained, and in the case where the obtained $CO_2$ concentration is the predetermined value or less (in the case of the source gas 11, 10 mol % or less for example, and in the case of the first permeable gas 14A, 80 mol % or less for example), the second permeable gas 14B after membrane separation by the second membrane separator 13B and the first permeable gas 14A after membrane separation by the first membrane separator 13A are recycled to the source gas 11 side. Note that, the predetermined value is varied depending on the required concentration of the collected $CO_2$ and the like.

Here, Table 2 below shows difference in the separation efficiency of $CO_2$ membrane separation between the case in which the first permeable gas 14A and the second permeable gas 14B are recycled to the source gas introduction line $L_{11}$ of the upstream side of the compressor 12 as in the present example to increase the $CO_2$ concentration in the source gas 11 to obtain the $CO_2$ additive source gas 11A and the case in which they are not recycled as usual. Note that, the second comparative example is the case where only one stage of the first membrane separator 13A is used for processing.

TABLE 2

| | | Source Gas 11 | First Membrane Separator 13A Inlet | First Membrane Separator 13A Permeation Side | First Membrane Separator 13A Non-Permeation Side | Second Membrane Separator 13B Permeation Side | Second Membrane Separator 13B Non-Permeation Side |
|---|---|---|---|---|---|---|---|
| Second Experimental Example | $CO_2$ Concentration [mol %] | 10 | 24.2 | 90.5 | 7.6 | 71 | 1.1 |
| | $CH_4$ Concentration [mol %] | 90 | 75.8 | 9.5 | 92.4 | 29 | 98.9 |
| | $CO_2$ Flow Rate [kmol/h] | 10 | 30 | 22.5 | 7.5 | 6.5 | 1 |
| | $CH_4$ Flow Rate [kmol/h] | 90 | 94 | 2.4 | 91.7 | 2.6 | 89.1 |
| Second Comparative Example | $CO_2$ Concentration [mol %] | 10 | 10 | 76.9 | 1.1 | — | — |
| | $CH_4$ Concentration [mol %] | 90 | 90 | 23.1 | 98.9 | — | — |
| | $CO_2$ Flow Rate [kmol/h] | 10 | 10 | 9 | 1 | — | — |
| | $CH_4$ Flow Rate [kmol/h] | 90 | 90 | 2.7 | 87.3 | — | — |

In this experimental example, membrane separation was performed using the source gas 11 having the $CO_2$ concentration of 10 mol % and the $CH_4$ concentration of 90 mol %.

In the case of the second experimental example, as illustrated in FIG. 4, the second permeable gas 14B is returned to the source gas 11 at the upstream side of the compressor 12 and the first permeable gas 14A is returned to the downstream side of the compressor 12. The $CO_2$ concentration at the first membrane separator 13A inlet is increased by the amount of return, which is 14.2 mol %, and the $CO_2$ concentration becomes 24.2 mol %. As a result, the $CO_2$ concentration of the first permeable gas 14A of the permeation side of the first membrane separator 13A becomes 90.5 mol %.

In contrast, in the case of the second comparative example, since the second permeable gas 14B is not returned to the source gas 11 at the upstream side of the compressor 12, the $CO_2$ concentration at the first membrane separator 13A inlet is 10 mol % as the same composition as the source gas 11, and the $CO_2$ concentration of the first permeable gas 14A at the first membrane separator 13A permeation side becomes 76.9 mol %. In addition, the rate of recycle of the first membrane separator 13A side gas in the second experimental example was 60% and the collection flow rate as the collected $CO_2$ was 9 kmol/h.

Therefore, since it is possible to increase the $CO_2$ concentration of the $CO_2$ additive source gas 11A to be introduced to the first membrane separator 13A more than the $CO_2$ concentration in the source gas 11 as in the second experimental example, it is possible to obtain $CO_2$ gas with high purity in which less non-$CO_2$ gas component is contained as the first permeable gas 14A through the first membrane separator 13A.

As a result, since the amount of non-$CO_2$ gas component (for example, methane) contained in the permeable gas through the first membrane separator 13A to be separated as condensed $CO_2$ is small, it is possible to increase the rate of collection of methane, for example, which is non-$CO_2$ gas component in the first non-permeable gas 15A and in the second non-permeable gas 15B, from the source gas.

Third Example

Figure 5:
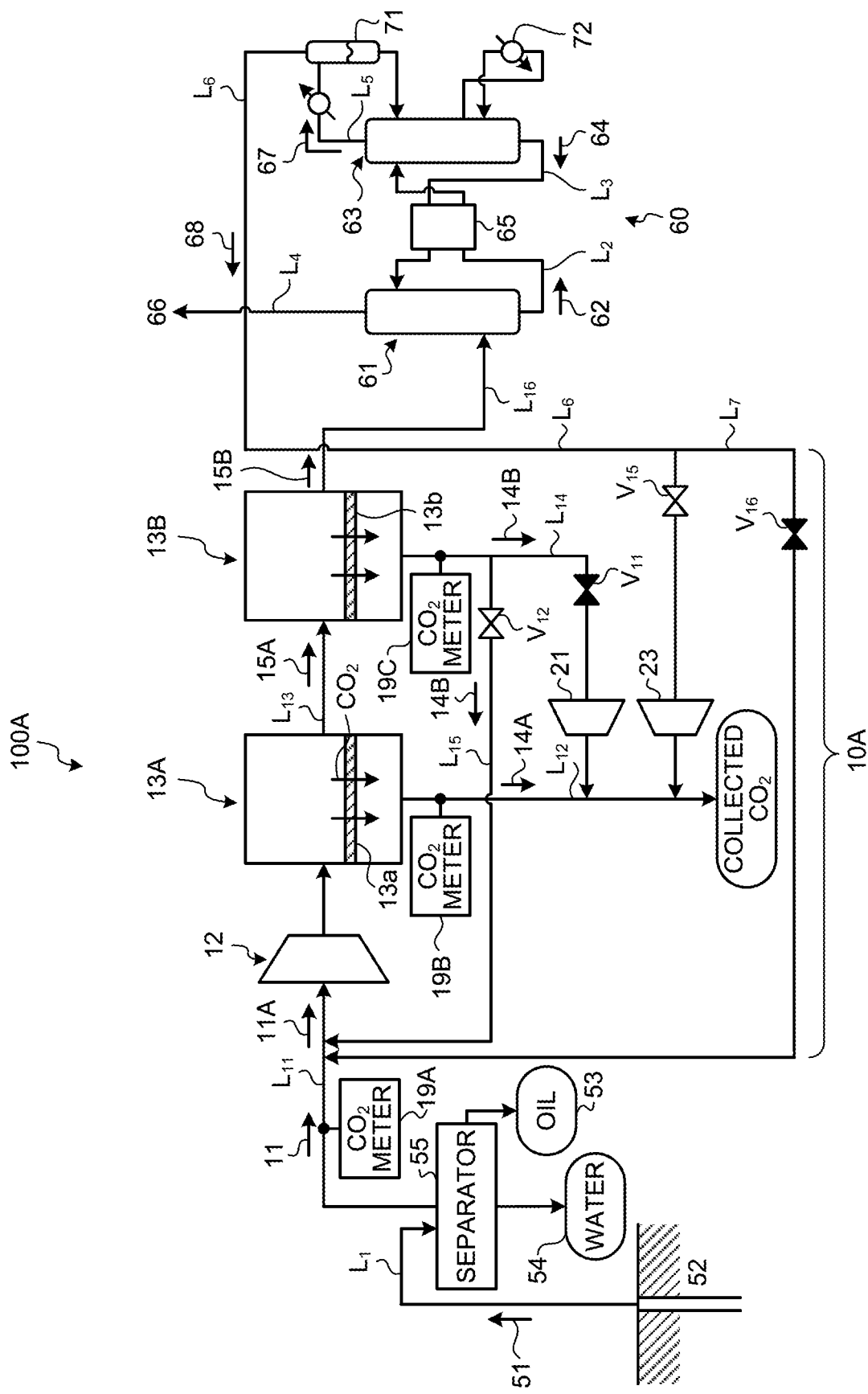
FIG. 5 is a schematic diagram illustrating a system for separating $CO_2$ from oil-associated gas including a $CO_2$ separation device in gas according to a third example.

FIG. 5 is a schematic diagram illustrating a system for separating $CO_2$ from oil-associated gas including a $CO_2$ separation device in gas according to the third example. Note that, the same components as the $CO_2$ separation device in gas according to the first and second examples are given the same reference numerals and description thereof is omitted.

As illustrated in FIG. 5, a system for separating $CO_2$ from oil-associated gas 100A according to the present example includes a production well 52 for pressing crude oil (including associated gas) 51, a separator 55 for separating the crude oil 51 into oil 53, associated gas to be the source gas 11, and water 54, respectively, the $CO_2$ separation device 10A in gas including the first membrane separator 13A and the second membrane separator 13B according to the first example, and $CO_2$ separation equipment 60 for further separating $CO_2$ left in the second non-permeable gas 15B from the second membrane separator 13B.

The crude oil 51 is produced from the production well 52, and supplied to the separator 55 through a crude oil mining line $L_1$, and the oil 53 and the water 54 are separated therefrom and associated gas is separated. In the present example, this associated gas is the source gas 11.

The source gas 11 is processed in the same manner as in the first example and improvement of the $CO_2$ separation efficiency is sought. In the present example, in the case where $CO_2$ is left in the second non-permeable gas 15B of the second membrane separator 13B in the amount more than the desired amount, purified gas 66 in which $CO_2$ has been removed from the source gas 11 is obtained by removing by the $CO_2$ separation equipment 60 by chemical absorption method or physical absorption method.

The $CO_2$ separation equipment 60 according to the present example uses amine solvent as absorbent, includes a $CO_2$ absorber 61 for removing $CO_2$ in the second non-permeable gas 15B and a regenerator 63 for regenerating absorbent by releasing $CO_2$ by water vapor by a reboiler 72 from rich solution 62 that has absorbed $CO_2$ in the $CO_2$ absorber 61, and circulates and uses lean solution 64 from which $CO_2$ has been released in the regenerator 63 again in the $CO_2$ absorber 61. Note that, heat of the rich solution 62 and that of the lean solution 64 are exchanged by a heat exchanger 65.

The second non-permeable gas 15B from which $CO_2$ has been removed in the $CO_2$ absorber 61 is purified gas 66 rich in methane. Here, in FIG. 5, the reference numeral $L_2$ indicates a rich solution supply line, $L_3$ indicates a lean solution supply line, $L_4$ indicates a purified gas discharge line, $L_5$ indicates a $CO_2$-associated water vapor discharge line, $L_6$ indicates a $CO_2$ collection line, and $L_7$ indicates a $CO_2$ collection branch line.

Water vapor 67 associated with $CO_2$ is released from the top of the regenerator 63 that regenerates the rich solution 62, and $CO_2$ is separated by a gas-liquid separator 71 to be separation gas 68. $CO_2$ separated by the gas-liquid separator 71 opens a fifth valve $V_{15}$ provided in the $CO_2$ collection line $L_6$ by the $CO_2$ collection line $L_6$ as with $CO_2$ separated by the second membrane separator 13B and is compressed by the auxiliary compressor 23 to be collected as collected $CO_2$.

As with the first example, in the system for separating $CO_2$ from oil-associated gas 100A according to the present example, the $CO_2$ concentration in the source gas 11 or the first permeable gas 14A is obtained, and the second permeable gas 14B after membrane separation by the second membrane separator 13B is recycled to the source gas 11 side in the case where the obtained $CO_2$ concentration is the predetermined value or less (in the case of the source gas 11, 20 mol % or less, for example, and in the case of the first permeable gas 14A, 90 mol % or less, for example). Note that, the predetermined value is varied by required concentration of collected $CO_2$ and the like.

Then, by returning the second permeable gas 14B to the source gas 11 side, the second permeable gas 14B in which $CO_2$ is condensed is introduced in the source gas 11 and the $CO_2$ partial pressure is increased. As a result, since the $CO_2$ concentration in the source gas 11 is increased more than the case in which the second permeable gas 14B is not recycled, the driving force of membrane separation by the first membrane separator 13A is improved. Accordingly, it is possible to improve selective separability of $CO_2$ by the first membrane separator 13A more than the case in which the second permeable gas 14B is not recycled.

Here, Table 3 below shows difference in separation efficiency of $CO_2$ membrane separation between the case in which the second permeable gas 14B is recycled to the source gas 11 at the upstream side of the compressor 12 as in the present example to obtain $CO_2$ additive source gas 11A and the case in which it is not recycled as usual. Note that, the third comparative example is the case in which only one stage of the first membrane separator 13A is used for processing.

TABLE 3

| | | Source Gas 11 | First Membrane Separator 13A Inlet | First Membrane Separator 13A Permeation Side | First Membrane Separator 13A Non-Permeation Side | CO$_2$ Absorber 61 Outlet | Regenerator 63 Outlet |
|---|---|---|---|---|---|---|---|
| Third Experimental Example | CO$_2$ Concentration [mol %] | 20 | 28.6 | 92.3 | 15.7 | 0.3 | 100 |
| | CH$_4$ Concentration [mol %] | 80 | 71.4 | 7.7 | 84.3 | 99.7 | 0 |
| | CO$_2$ Flow Rate [kmol/h] | 20 | 33 | 18 | 15 | 0.2 | 1.8 |
| | CH$_4$ Flow Rate [kmol/h] | 80 | 82 | 1.5 | 80.8 | 78.5 | 0 |
| Third Comparative Example | CO$_2$ Concentration [mol %] | 20 | 20 | 88.2 | 2.5 | 0.3 | 100 |
| | CH$_4$ Concentration [mol %] | 80 | 80 | 11.8 | 97.5 | 99.7 | 0 |
| | CO$_2$ Flow Rate [kmol/h] | 20 | 20 | 18 | 2 | 0.2 | 1.8 |
| | CH$_4$ Flow Rate [kmol/h] | 80 | 80 | 2.4 | 77.6 | 77.6 | 0 |

In this experimental example, membrane separation was performed using the source gas 11 having the CO$_2$ concentration of 20 mol % and the CH$_4$ concentration of 80 mol %.

In the case of the third experimental example, as illustrated in FIG. 5, since the second permeable gas 14B is returned to the source gas 11 at the upstream side of the compressor 12, the CO$_2$ concentration at the first membrane separator 13A inlet is increased by the amount of return, which is 8.6 mol %, and the CO$_2$ concentration becomes 28.6 mol %. As a result, the CO$_2$ concentration of the first permeable gas 14A at the permeation side of the first membrane separator 13A becomes 92.3 mol %.

In addition, the CO$_2$ concentration of the purified gas 66 at the CO$_2$ absorber 61 outlet becomes 0.3 mol %, and the CH$_4$ concentration thereof becomes 99.7 mol %, and the CO$_2$ concentration of the separation gas 68 at the regenerator 63 outlet becomes 100 mol %, and the CH$_4$ concentration thereof becomes 0 mol %. As a result, the CH$_4$ collection rate becomes 98.1%.

In contrast, in the case of the third comparative example, since the second permeable gas 14B is not returned to the source gas 11 at the upstream side of the compressor 12, the CO$_2$ concentration at the first membrane separator 13A inlet is 20 mol % as the same composition as the source gas 11 and the CO$_2$ concentration of the first permeable gas 14A at the first membrane separator 13A permeation side becomes 88.2 mol %.

In addition, the CO$_2$ concentration of the purified gas 66 at the CO$_2$ absorber 61 outlet becomes 0.3 mol %, and the CH$_4$ concentration thereof becomes 99.7 mol %, and the CO$_2$ concentration of the separation gas 68 at the regenerator 63 outlet becomes 100 mol %, and the CH$_4$ concentration thereof becomes 0 mol %. As a result, the CH$_4$ collection rate becomes 97.0%.

Therefore, since it is possible to increase the CO$_2$ concentration of the CO$_2$ additive source gas 11A to be introduced in the first membrane separator 13A more than the CO$_2$ concentration in the source gas 11 as in the third experimental example, it is possible to obtain CO$_2$ gas with high purity in which less non-CO$_2$ gas component is contained as the first permeable gas 14A through the first membrane separator 13A.

As a result, since the amount of non-CO$_2$ gas component (for example, methane) contained in the first permeable gas 14A through the first membrane separator 13A to be separated as condensed CO$_2$ becomes small, it is possible to increase the collection rate of methane, for example, which is non-CO$_2$ gas component in the first non-permeable gas 15A, from the source gas.

Fourth Example

Figure 6:
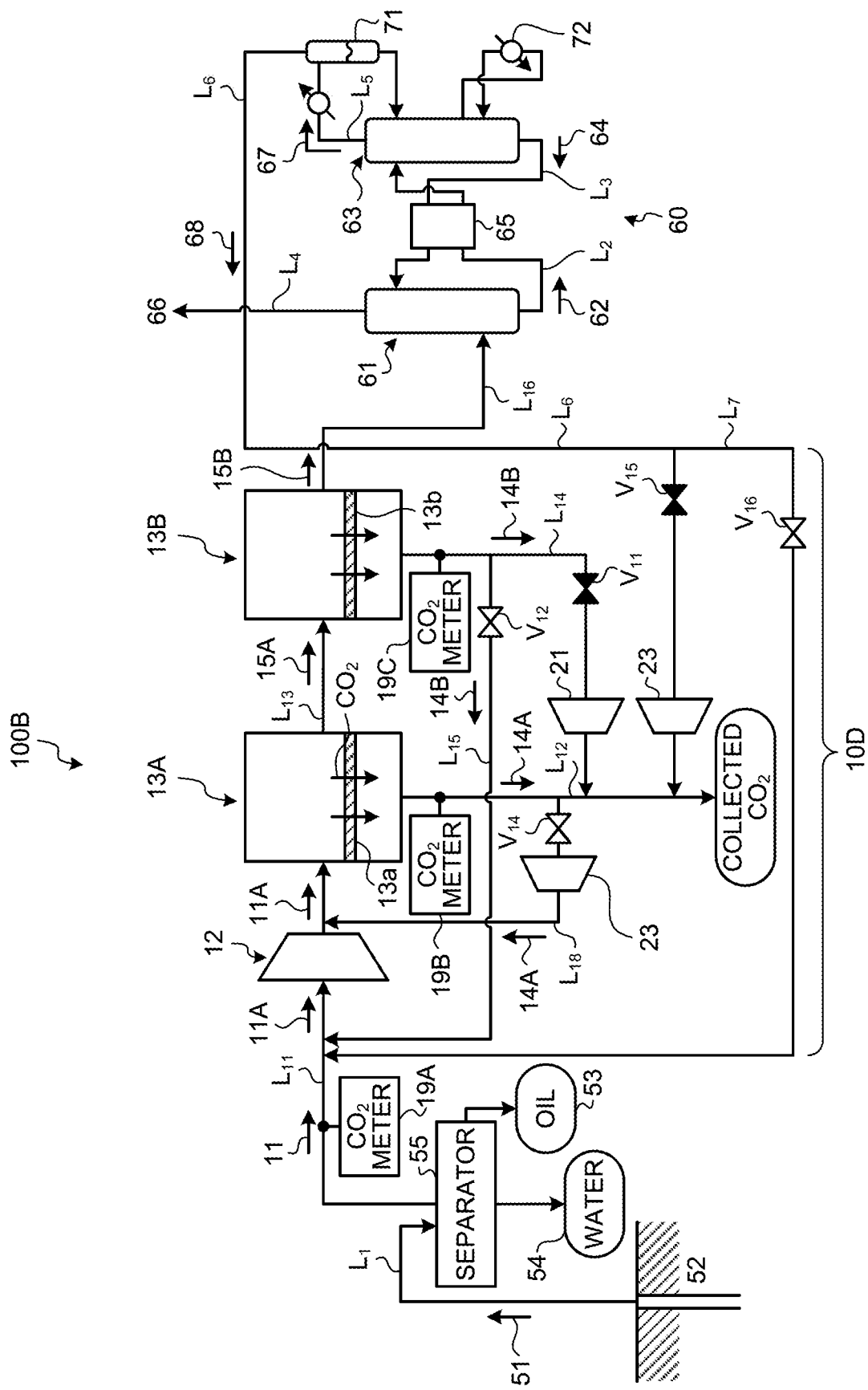
FIG. 6 is a schematic diagram illustrating a system for separating $CO_2$ from oil-associated gas including a $CO_2$ separation device in gas according to a fourth example.

FIG. 6 is a schematic diagram illustrating a system for separating CO$_2$ from oil-associated gas including a CO$_2$ separation device in gas according to the fourth example. Note that, the same components as the components of the system for separating CO$_2$ from oil-associated gas according to the third example are given the same reference numerals and description thereof is omitted.

As illustrated in FIG. 6, a system for separating CO$_2$ from oil-associated gas 100B according to the present example includes the production well 52 for pressing the crude oil (including associated gas) 51, the separator 55 for separating the crude oil 51 into the oil 53, associated gas to be the source gas 11, and the water 54, respectively, the CO$_2$ separation device 10D in gas including the first membrane separator 13A and the second membrane separator 13B according to the second example, and the CO$_2$ separation equipment 60 for further separating $CO_2$ left in the second non-permeable gas 15B from the second membrane separator 13B.

Then, the $CO_2$ concentration in the source gas 11 or the first permeable gas 14A is obtained, and the second permeable gas 14B after membrane separation by the second membrane separator 13B, the first permeable gas 14A after membrane separation by the first membrane separator 13A, and the separation gas 68 from the $CO_2$ separation equipment 60 are recycled to the source gas 11 side with a sixth valve $V_{16}$ provided in the $CO_2$ collection branch line $L_7$ branched from the $CO_2$ collection line $L_6$ opened, in the case where the obtained $CO_2$ concentration is the predetermined value or less (in the case of the source gas 11, 10 mol % or less, for example, and in the case of the first permeable gas 14A, 80 mol % or less, for example).

According to the system for separating $CO_2$ from oil-associated gas 100B according to the present example, since $CO_2$ as the separation gas 68 diffused from the regenerator 63 is added to the source gas 11, it is possible to improve the separation efficiency of $CO_2$ in the source gas 11.

As described above, it is possible to remove $CO_2$ in the source gas 11 including $CO_2$ as impurity at a higher level and to obtain $CO_2$ with high purity as collected $CO_2$.

Fifth Example

Figure 7:
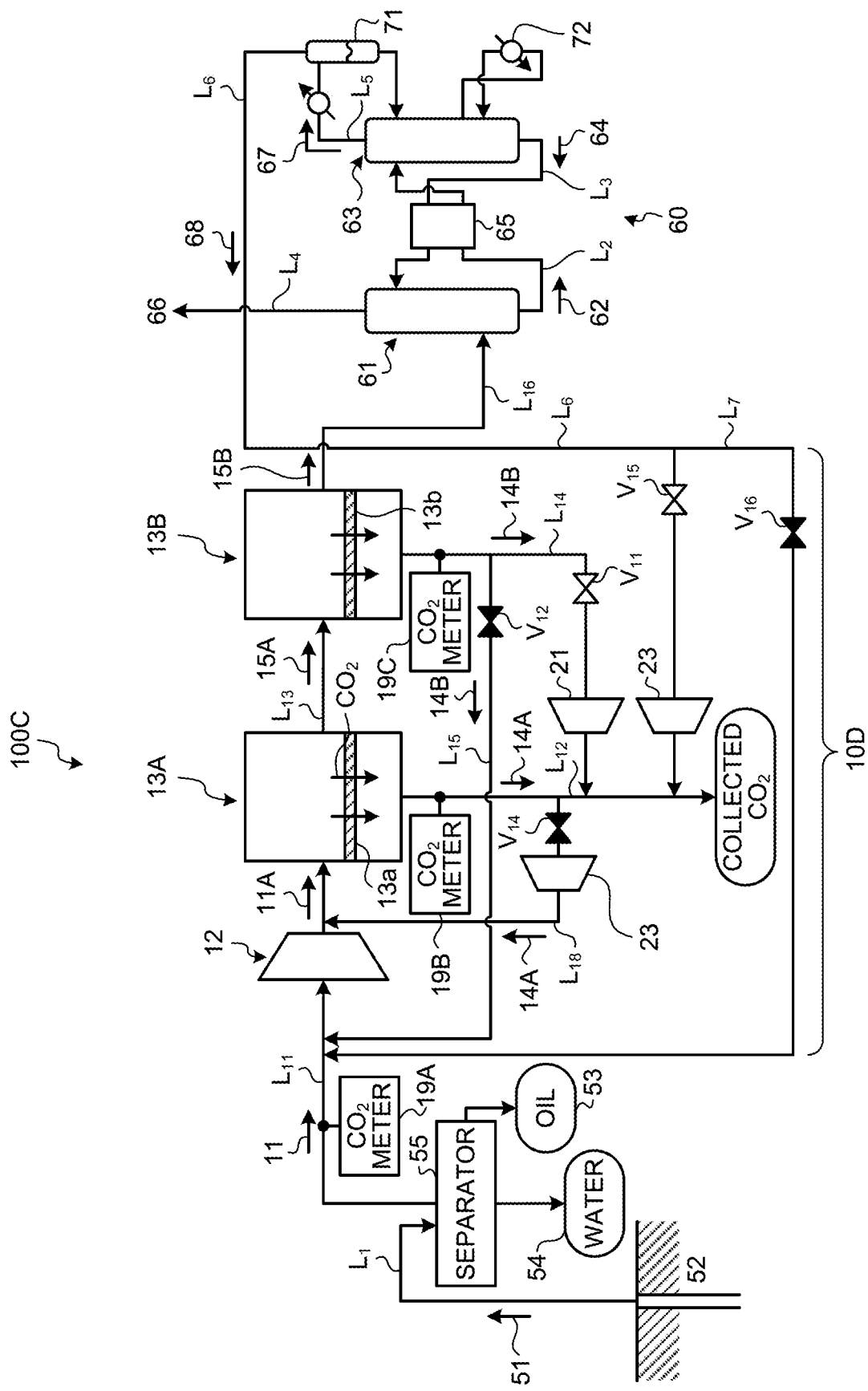
FIG. 7 is a schematic diagram illustrating a system for separating $CO_2$ from oil-associated gas including a $CO_2$ separation device in gas according to a fifth example.

FIG. 7 is a schematic diagram illustrating a system for separating $CO_2$ from oil-associated gas including a $CO_2$ separation device in gas according to the fifth example. Note that, the same components as the components of the system for separating $CO_2$ from oil-associated gas according to the fourth example are given the same reference numerals and description thereof is omitted.

As illustrated in FIG. 7, in a system for separating $CO_2$ from oil-associated gas 100C according to the present example, whether or not the second permeable gas 14B is recycled is controlled by the $CO_2$ concentration.

First, in the present example, the $CO_2$ concentration in the first permeable gas 14A is obtained by the $CO_2$ meter 19B. If the obtained $CO_2$ concentration is over 90 mol %, for example, it is determined that the second permeable gas 14B is not recycled.

The reason why the $CO_2$ concentration is determined in the first permeable gas 14A is to consider the degree of deterioration of the separation membrane 13a and to determine if it satisfies the $CO_2$ concentration of collected $CO_2$ of product requirements.

That is, the desired value of the $CO_2$ concentration (purity) of the first permeable gas 14A is different according to where to apply the collected $CO_2$. For example, it may be 90 mol % or may be 92 mol % or more.

As described, in the case where the $CO_2$ concentration in the first and second permeable gas 14A and 14B in which $CO_2$ is condensed by the first membrane separator 13A and the second membrane separator 13B is measured by the $CO_2$ meters 19B and 19C and it satisfies the desired $CO_2$ purity, increase of compression power necessary for recycling the $CO_2$ enrichment gas to the source gas 11 by reducing the amount of recycle of the first and second permeable gas 14A and 14B to the source gas 11 and the separation gas 68 regenerated in the regenerator 63 to the source gas 11, or not recycling them.

As a result, in the present example, in the case where the $CO_2$ concentration is the desired value, operation can be performed without unnecessary recycling by reducing the amount of recycle of the first and second permeable gas 14A and 14B to the source gas 11 and the separation gas 68 regenerated in the regenerator 63 to the source gas 11, or not recycling them.

Here, Table 4 below shows the $CO_2$ separation efficiency in the case where the second permeable gas 14B is not recycled to the source gas 11 as in the present example.

TABLE 4

| | | Source Gas 11 | First Membrane Separator 13A Permeation Side | Second Membrane Separator 13B Permeation Side | $CO_2$ Absorber 61 Outlet | Regenerator 63 Outlet |
|---|---|---|---|---|---|---|
| Fourth Experimental Example | $CO_2$ Concentration [mol %] | 30 | 92.8 | 90.7 | 0.4 | 100 |
| | $CH_4$ Concentration [mol %] | 70 | 7.2 | 9.3 | 99.6 | 0 |
| | $CO_2$ Flow Rate [kmol/h] | 30 | 7.5 | 19.5 | 0.3 | 2.7 |
| | $CH_4$ Flow Rate [kmol/h] | 70 | 0.6 | 2.0 | 67.4 | 0 |

In this experimental example, membrane separation was performed using the source gas 11 having the $CO_2$ concentration of 30 mol % and the $CH_4$ concentration of 70 mol %.

In the case of the fourth experimental example, as illustrated in FIG. 7, the second permeable gas 14B is not returned to the source gas 11 at the upstream side of the compressor 12. As a result, the $CO_2$ concentration of the first permeable gas 14A at the first membrane separator 13A permeation side becomes 92.8 mol %, and the $CO_2$ concentration of the second permeable gas 14B at the second membrane separator 13B permeation side becomes 90.7 mol %. In addition, the $CO_2$ concentration of the purified gas 66 at the $CO_2$ absorber 61 outlet becomes 0.4 mol %, and the $CH_4$ concentration thereof becomes 99.6 mol %, and the $CO_2$ concentration of the separation gas 68 at the regenerator 63 outlet becomes 100 mol %, and the $CH_4$ concentration thereof becomes 0 mol %. As a result, the $CH_4$ collection rate becomes 96.3%.

Sixth Example

Figure 8:
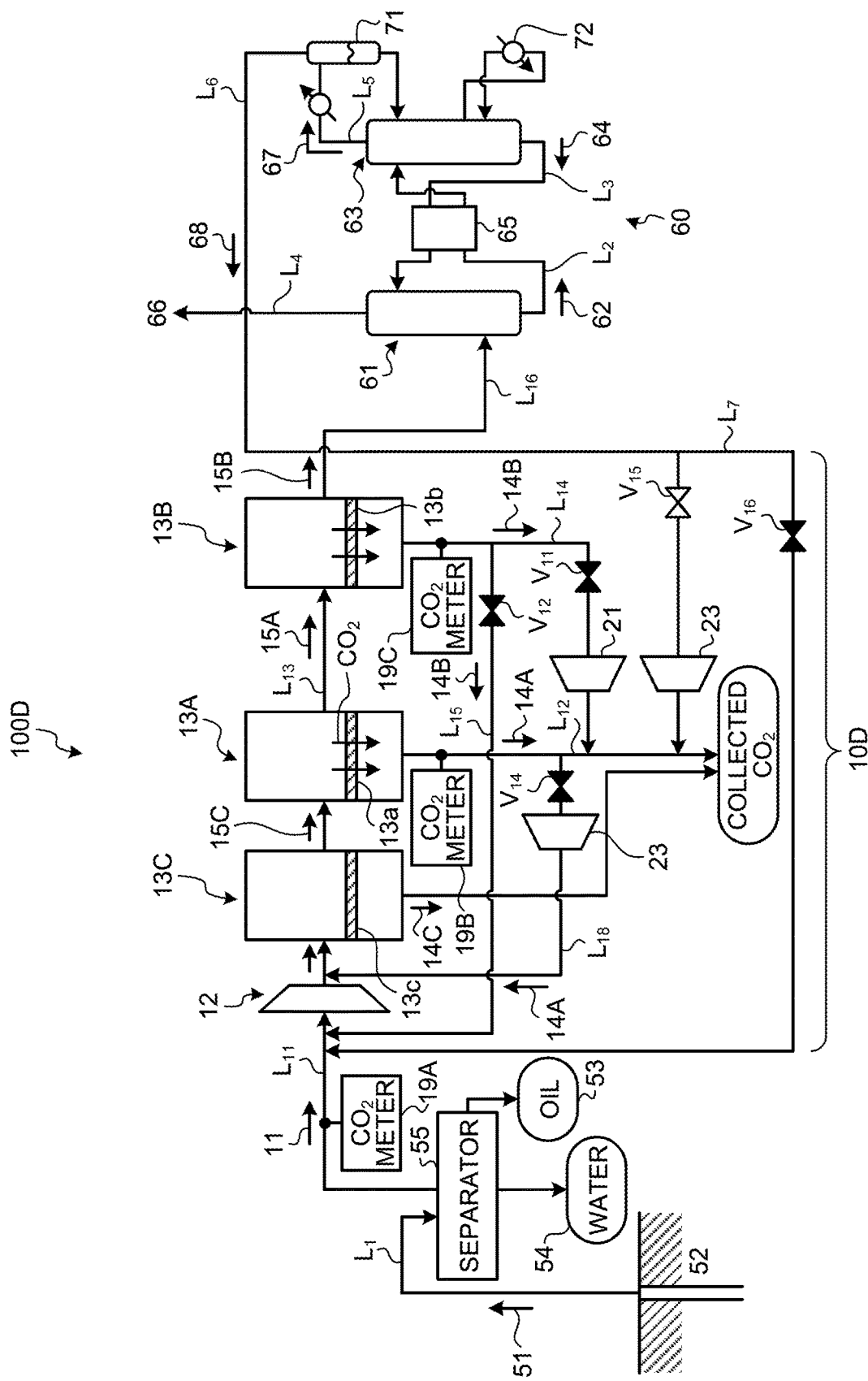
FIG. 8 is a schematic diagram illustrating a system for separating $CO_2$ from oil-associated gas including a $CO_2$ separation device in gas according to a sixth example.

FIG. 8 is a schematic diagram illustrating a system for separating $CO_2$ from oil-associated gas including a $CO_2$ separation device in gas. Note that, the same components as the components of the system for separating $CO_2$ from oil-associated gas according to the fourth example are given the same reference numerals and description thereof is omitted.

As illustrated in FIG. 8, a system for separating $CO_2$ from oil-associated gas 100D according to the present example includes the production well 52 for pressing the crude oil (including associated gas) 51, the separator 55 for separating the crude oil 51 into the oil 53, associated gas to be the source gas 11, and the water 54, respectively, the $CO_2$ separation device 10D in gas including the first membrane separator 13A and the second membrane separator 13B according to the second example, the $CO_2$ separation equipment 60 for further separating $CO_2$ left in the second non-permeable gas 15B from the second membrane separator 13B, the $CO_2$ meter 19A for measuring the $CO_2$ concentration in the source gas 11, and a third membrane separator 13C including separation membrane 13c that is provided at the upstream side of the first membrane separator 13A, separates $CO_2$ in the source gas 11 in accordance with the $CO_2$ concentration in the source gas 11, and obtains the source gas 11 having the $CO_2$ gas concentration of the predetermined concentration.

Here, the $CO_2$ concentration in the source gas 11 may largely vary according to the component of the associated gas in the crude oil 51 from the production well 52 to be mined.

$CO_2$ in the associated gas in the crude oil 51 largely increases in some cases in accordance with variation over time for a long time (for example, ten years or twenty years and more). Particularly, in the case where $CO_2$ is returned to an oilfield and the like as $CO_2$ EOR, it tends to increase.

Moreover, when the source gas 11 from several production wells 52 is concentrated and $CO_2$ is selectively separated from the mixed source gas 11, the $CO_2$ concentration extremely varies in some cases.

In the present example, as a measure for such a case, the third membrane separator 13C for pre-processing is provided between the compressor 12 and the first membrane separator 13A to adjust the $CO_2$ concentration in the source gas 11 supplied to the first membrane separator 13A to the predetermined concentration and adjustment is made to obtain third non-permeable gas 15C having the $CO_2$ concentration of the predetermined concentration (30 mol % or less).

Accordingly, the concentration of the source gas 11 to be introduced in the first membrane separator 13A can be the concentration similar to that of the fifth example.

Accordingly, it is possible to prevent excessive $CO_2$ that cannot be separated by the separation membrane 13b in the case where the $CO_2$ concentration is high from being introduced to the $CO_2$ separation equipment 60 of amine absorption method.

That is, in the $CO_2$ separation equipment 60, the $CO_2$ concentration to be introduced is determined by initial design and the $CO_2$ separation equipment 60 needs to be provided more if it exceeds that $CO_2$ concentration because it cannot be processed.

In the present example, it is possible to solve this by providing the third membrane separator 13C for pre-processing.

As a result, it is possible to appropriately deal with a case in which the composition and the flow rate of the source gas 11 vary.

In the present example, additional third membrane separators 13C for pre-processing are added in appropriate stages to the rear stream of the compressor 12 of the source gas 11 in the case where the flow rate of the source gas 11 increases with the change of the $CO_2$ flow rate over time. Accordingly, after the $CO_2$ gas equivalent to the amount of increase in the flow rate of the source gas 11 is taken as condensed $CO_2$ with high purity by the additional third membrane separator 13C for pre-processing, the source gas 11 with reduced flow rate is supplied to the first membrane separator 13A as with the fourth example.

As described, it is possible to remove $CO_2$ in the source gas 11 containing $CO_2$ as impurity with high accuracy and to obtain $CO_2$ with high purity.

Therefore, it is possible to supplement deficiency in performance in accordance with increase of the processed gas amount without modifying the $CO_2$ separation equipment 60 after the membrane separator when the flow rate of the source gas 11 increases in accordance with increase in the amount of $CO_2$ in the source gas 11 without major $CO_2$ separation process change by providing additional third membrane separators 13C.

Here, Table 5 below shows $CO_2$ separation efficiency in the case where $CO_2$ is separated from the source gas 11 as in the present example.

TABLE 5

| | | Source Gas 11 | Third Membrane Separator 13C Permeation Side | Third Membrane Separator 13C Non-Permeation Side | First Membrane Separator 13A Permeation Side | Second Membrane Separator 13B Permeation Side | $CO_2$ Absorber 61 Outlet | Regenerator 63 Outlet |
|---|---|---|---|---|---|---|---|---|
| Fifth Experimental Example | $CO_2$ Concentration [mol %] | 49.5 | 96.7 | 30 | 92.8 | 90.7 | 0.4 | 100 |
| | $CH_4$ Concentration [mol %] | 50.5 | 3.3 | 70 | 7.2 | 9.3 | 99.6 | 0 |
| | $CO_2$ Flow Rate [kmol/h] | 70 | 40 | 30 | 7.5 | 19.5 | 0.3 | 2.7 |

TABLE 5-continued

| | Source Gas 11 | Third Membrane Separator 13C Permeation Side | Third Membrane Separator 13C Non-Permeation Side | First Membrane Separator 13A Permeation Side | Second Membrane Separator 13B Permeation Side | $CO_2$ Absorber 61 Outlet | Regenerator 63 Outlet |
|---|---|---|---|---|---|---|---|
| $CH_4$. Flow Rate [kmol/h] | 71.4 | 1.4 | 70 | 0.6 | 2.0 | 67.4 | 0 |

In this experimental example, membrane separation was performed using the source gas 11 having the $CO_2$ concentration of 49.5 mol % and the $CH_4$ concentration of 50.5 mol %.

In the case of the fifth experimental example, as illustrated in FIG. 8, the source gas 11 that has passed the compressor 12 is caused to pass the third membrane separator 13C. As a result, the $CO_2$ concentration of the third permeable gas 14C at the third membrane separator 13C permeation side becomes 96.7 mol %, the $CH_4$ concentration thereof becomes 3.3 mol %, and the $CO_2$ concentration of the third non-permeable gas 15C at the third membrane separator 13C non-permeation side becomes 30 mol % and the $CH_4$ concentration thereof becomes 70 mol %.

In addition, the $CO_2$ concentration of the first permeable gas 14A at the first membrane separator 13A permeation side becomes 92.8 mol %, the $CH_4$ concentration thereof becomes 7.2 mol %, and the $CO_2$ concentration of the second permeable gas 14B at the second membrane separator 13B permeation side becomes 90.7 mol % and the $CH_4$ concentration thereof becomes 9.3 mol %. In addition, the $CO_2$ concentration of the purified gas 66 at the $CO_2$ absorber 61 outlet becomes 0.4 mol %, and the $CH_4$ concentration thereof becomes 99.6 mol %, and the $CO_2$ concentration of the separation gas 68 at the regenerator 63 outlet becomes 100 mol % and the $CH_4$ concentration thereof becomes 0 mol %. As a result, the $CH_4$ collection rate becomes 94.4%.

Figure 9:
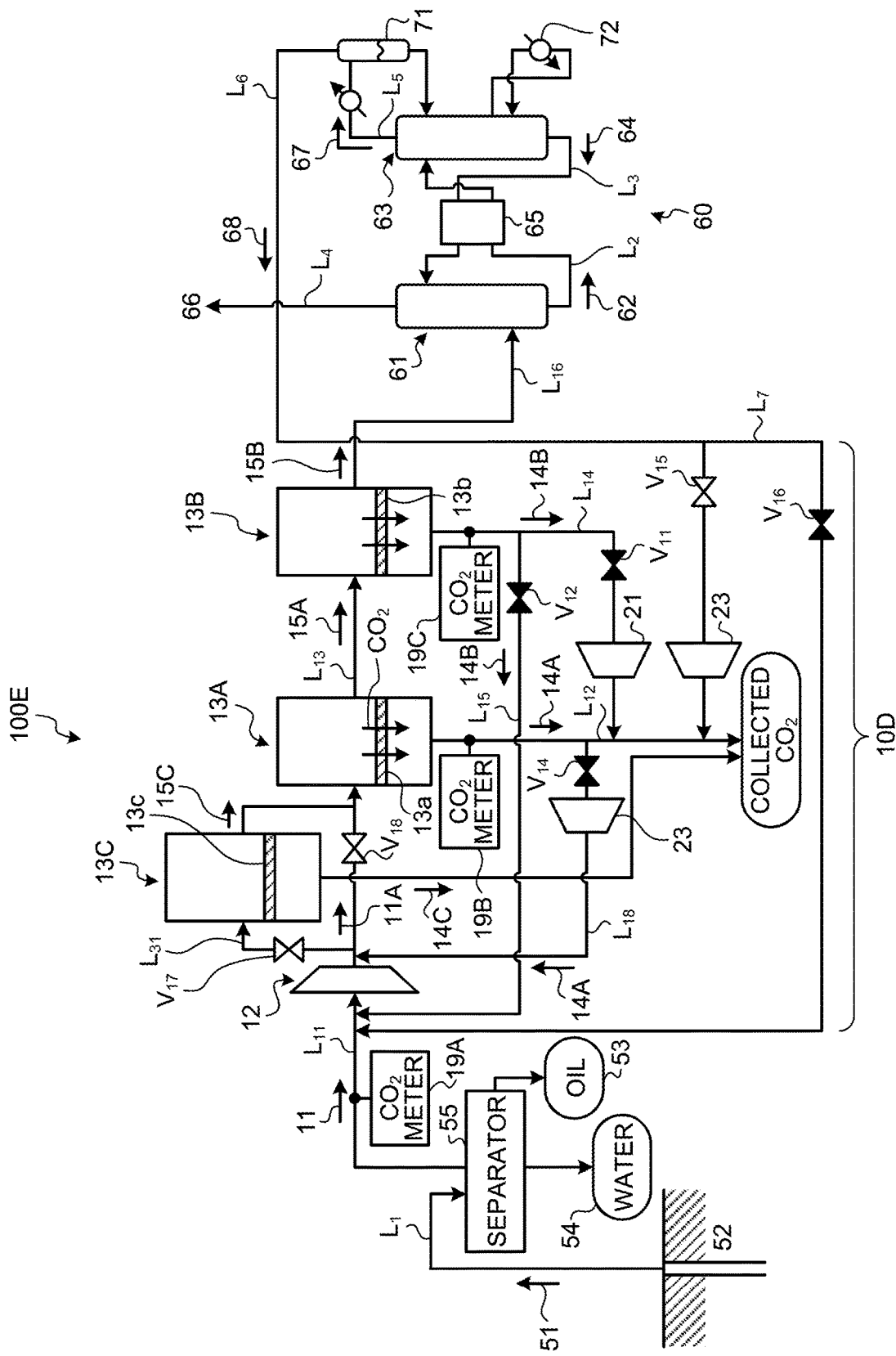
FIG. 9 is a schematic diagram illustrating a system for separating $CO_2$ from oil-associated gas including another $CO_2$ separation device in gas according to the sixth example.

FIG. 9 is a schematic diagram illustrating another system for separating $CO_2$ from oil-associated gas including a $CO_2$ separation device in gas according to the present example.

In a system for separating $CO_2$ from oil-associated gas 100E including the $CO_2$ separation device in gas illustrated in FIG. 9, a third membrane separator 13C is provided in a bypass line $L_{31}$. A seventh valve $V_{17}$ is provided in this bypass line $L_{31}$ and an eighth valve $V_{18}$ is provided in the source gas introduction line $L_{11}$.

When membrane separation of a $CO_2$ separation device in gas is controlled, $CO_2$ in the source gas 11 is monitored, and in the case where it is determined that the $CO_2$ concentration has increased more than the predetermined amount, the source gas 11 after passing the compressor 12 is introduced to the third membrane separator 13C by completely opening the seventh valve $V_{17}$ and closing the eighth valve $V_{18}$, $CO_2$ is separated here, and $CO_2$ in the source gas 11 is adjusted to be the third non-permeable gas 15C with the predetermined concentration.

Therefore, according to the present example, $CO_2$ can be separated according to the fourth to the sixth examples in accordance with the concentration of the source gas 11. Moreover, in the case where the $CO_2$ concentration in the source gas 11 is high, the line is switched to the bypass line $L_{31}$ side, the source gas 11 after passing the compressor 12 is introduced to the third membrane separator 13C, and $CO_2$ is separated and adjusted to be the predetermined concentration so that $CO_2$ can be membrane-separated.

Accordingly, it is possible to adjust the amount of recycle of $CO_2$ enrichment gas to the source gas 11 according to the purity of the $CO_2$ enrichment gas and it is possible to deal with the case in which the $CO_2$ concentration is increased.

REFERENCE SIGNS LIST 10A to 10D $CO_2$ SEPARATION DEVICE IN GAS
11 SOURCE GAS
12 COMPRESSOR
13A to 13C FIRST TO THIRD MEMBRANE SEPARATORS
13a to 13c SEPARATION MEMBRANE
14A to 14C FIRST TO THIRD PERMEABLE GAS
15A to 15C FIRST TO THIRD NON-PERMEABLE GAS
100A to 100E SYSTEM FOR SEPARATING $CO_2$ FROM OIL-ASSOCIATED GAS

The invention claimed is:
1. A $CO_2$ separation device in gas, comprising:
a source gas introduction line configured to introduce source gas containing $CO_2$,
a first membrane separator connected to an end of the source gas introduction line and configured to membrane-separate $CO_2$ from the source gas;
a first permeable gas discharge line configured to discharge first permeable gas permeated by membrane separation of the first membrane separator to be collected as collected $CO_2$;
a first non-permeable gas discharge line configured to discharge first non-permeable gas not permeated by membrane separation of the first membrane separator;
a second membrane separator provided at a downstream side of the first membrane separator and configured to membrane-separate $CO_2$ from first non-permeable gas;
a second permeable gas discharge line configured to discharge second permeable gas permeated by membrane separation of the second membrane separator to be collected as collected $CO_2$;
a first permeable gas branch line branched from a part of the first permeable gas discharge line and configured to return the first permeable gas to the source gas;
a return line of second permeable gas branched from a part of the second permeable gas discharge line and configured to return the second permeable gas to a source gas side or a first non-permeable gas side; and
a $CO_2$ concentration meter provided in the first permeable gas discharge line and configured to measure $CO_2$ concentration in the first permeable gas; wherein the second permeable gas and a part of the first permeable gas is recycled to the source gas side in the case where the $CO_2$ concentration in the first permeable gas is 90 mol % or less.

2. The $CO_2$ separation device in gas according to claim 1, further comprising a $CO_2$ concentration meter for measuring $CO_2$ concentration in the source gas or the first permeable gas or the second permeable gas.

3. The $CO_2$ separation device in gas according to claim 1, further comprising:
   a $CO_2$ concentration meter for measuring $CO_2$ concentration in the source gas; and
   a third membrane separator for pre-processing provided at an upstream side of the first membrane separator and configured to separate $CO_2$ in the source gas in accordance with $CO_2$ concentration in the source gas to obtain source gas having $CO_2$ gas concentration of the predetermined concentration.

4. The $CO_2$ separation device in gas according to claim 1, in which a compressor provided in the source gas introduction line and configured to compress the introduced source gas is provided at an upstream side of the first membrane separator.

5. The $CO_2$ separation device in gas according to claim 1, further comprising:
   $CO_2$ separation equipment for further separating $CO_2$ in the second non-permeable gas discharged from the part of the second non-permeable gas discharge line; and
   a return line of $CO_2$ gas configured to return the $CO_2$ gas separated by the $CO_2$ separation equipment to the source gas or the first non-permeable gas.

6. The $CO_2$ separation device in gas according to claim 1, further comprising a compressor in the second permeable gas discharge line at a location after the return line of second permeable gas for compressing the second permeable gas to be collected as $CO_2$.

7. A $CO_2$ separation device in gas, comprising:
   a source gas introduction line configured to introduce source gas containing $CO_2$,
   a first membrane separator connected to an end of the source gas introduction line and configured to membrane-separate $CO_2$ from the source gas;
   a first permeable gas discharge line configured to discharge first permeable gas permeated by membrane separation of the first membrane separator to be collected as collected $CO_2$;
   a first non-permeable gas discharge line configured to discharge first non-permeable gas not permeated by membrane separation of the first membrane separator;
   a second membrane separator provided at a downstream side of the first membrane separator and configured to membrane-separate $CO_2$ from first non-permeable gas;
   a second permeable gas discharge line configured to discharge second permeable gas permeated by membrane separation of the second membrane separator to be collected as collected $CO_2$;
   a return line of second permeable gas branched from a part of the second permeable gas discharge line and configured to return the second permeable gas to a source gas side or a first non-permeable gas side; and
   a $CO_2$ concentration meter provided in the source gas introduction line and configured to measure $CO_2$ concentration in the source gas; wherein
   the second permeable gas is recycled to the source gas side in the case where the $CO_2$ concentration in the source gas is 20 mol % or less.

8. The $CO_2$ separation device in gas according to claim 7, further comprising a first permeable gas branch line branched from a part of the first permeable gas discharge line and configured to return the first permeable gas to the source gas.

9. The $CO_2$ separation device in gas according to claim 7, further comprising a $CO_2$ concentration meter for measuring $CO_2$ concentration in the source gas or the first permeable gas or the second permeable gas.

10. The $CO_2$ separation device in gas according to claim 7, further comprising:
    a $CO_2$ concentration meter for measuring $CO_2$ concentration in the source gas; and
    a third membrane separator for pre-processing provided at an upstream side of the first membrane separator and configured to separate $CO_2$ in the source gas in accordance with $CO_2$ concentration in the source gas to obtain source gas having $CO_2$ gas concentration of the predetermined concentration.

11. The $CO_2$ separation device in gas according to claim 7, in which a compressor provided in the source gas introduction line and configured to compress the introduced source gas is provided at an upstream side of the first membrane separator.

12. The $CO_2$ separation device in gas according to claim 7, further comprising:
    $CO_2$ separation equipment for further separating $CO_2$ in the second non-permeable gas discharged from the part of the second non-permeable gas discharge line; and
    a return line of $CO_2$ gas configured to return the $CO_2$ gas separated by the $CO_2$ separation equipment to the source gas or the first non-permeable gas.

13. A method of membrane separation in a $CO_2$ separation device in gas comprising:
    serially providing membrane separators including separation membrane for selectively separating $CO_2$ from source gas containing $CO_2$ in two stages;
    discharging first permeable gas permeated by membrane separation of the first membrane separator to be collected as collected $CO_2$ and second permeable gas permeated by membrane separation of the second membrane separator to be collected as collected $CO_2$,
    obtaining $CO_2$ concentration in the source gas or the first permeable gas after membrane separation by the first membrane separator when first non-permeable gas not permeated by membrane separation of the first membrane separator in the first stage is membrane-separated by the second membrane separator in the second stage;
    recycling the second permeable gas after membrane separation by the second membrane separator to a source gas side in the case where the obtained $CO_2$ concentration in the first permeable gas is 90 mol % or less, or the obtained $CO_2$ concentration in the source gas is 20 mol % or less; and
    returning the first permeable gas after membrane separation by the first membrane separator to the source gas.

14. A method of membrane separation in a $CO_2$ separation device in gas comprising:
    serially providing membrane separators including separation membrane for selectively separating $CO_2$ from source gas containing $CO_2$ in two stages;
    discharging first permeable gas permeated by membrane separation of the first membrane separator to be collected as collected $CO_2$ and second permeable gas permeated by membrane separation of the second membrane separator to be collected as collected $CO_2$, obtaining CO$_2$ concentration in the source gas or the first permeable gas after membrane separation by the first membrane separator when first non-permeable gas not permeated by membrane separation of the first membrane separator in the first stage is membrane-separated by the second membrane separator in the second stage;

recycling the second permeable gas after membrane separation by the second membrane separator to a source gas side in the case where the obtained CO$_2$ concentration in the first permeable gas is 90 mol % or less, or the obtained CO$_2$ concentration in the source gas is 20 mol % or less;

further separating CO$_2$ in second non-permeable gas from the second membrane separator by CO$_2$ separation equipment; and returning the CO$_2$ gas separated by the CO$_2$ separation equipment to the source gas or the first non-permeable gas.

15. A method for controlling membrane separation in the CO$_2$ separation device in gas, comprising:

serially providing first and second membrane separators including separation membrane for selectively separating CO$_2$ from source gas containing CO$_2$ in two stages, and providing a third membrane separator for pre-processing in a bypass line that bypasses a source gas introduction line at an upstream of the first membrane separator;

obtaining CO$_2$ concentration in the source gas when first non-permeable gas not permeated by membrane separation of the first membrane separator in the first stage is membrane-separated by the second membrane separator in the second stage; and membrane-separating CO$_2$ in the source gas by the third membrane separator for pre-processing, setting the CO$_2$ concentration of third non-permeable gas not permeated by the third membrane separator to 30 mol % or less and introducing the third non-permeable gas having the CO$_2$ concentration of 30 mol % or less to the first membrane separator to selectively separate CO$_2$.

* * * * *